(12) United States Patent
Itadani et al.

(10) Patent No.: US 8,361,363 B2
(45) Date of Patent: Jan. 29, 2013

(54) FOAM BOARD OF POLYOLEFIN RESIN AND METHOD FOR ITS PRODUCTION

(75) Inventors: Toru Itadani, Tokyo (JP); Masaaki Ono, Tokyo (JP); Kengo Ozaki, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 353 days.

(21) Appl. No.: 12/666,516

(22) PCT Filed: Jun. 27, 2008

(86) PCT No.: PCT/JP2008/061754
§ 371 (c)(1),
(2), (4) Date: Dec. 23, 2009

(87) PCT Pub. No.: WO2009/001934
PCT Pub. Date: Dec. 31, 2008

(65) Prior Publication Data
US 2010/0324162 A1  Dec. 23, 2010

(30) Foreign Application Priority Data

Jun. 27, 2007  (JP) .................................. 2007-169714

(51) Int. Cl.
*B29C 44/50* (2006.01)
(52) U.S. Cl. ... 264/51; 264/53; 264/211.12; 264/211.13
(58) Field of Classification Search .................... 264/51, 264/53, 211.12, 211.23
See application file for complete search history.

(56) References Cited

U.S. PATENT DOCUMENTS

2010/0273904 A1 * 10/2010 Itadani ............................ 521/79
2011/0021650 A1 * 1/2011 Itadani et al. ................... 521/79

FOREIGN PATENT DOCUMENTS

| JP | 2620968 | 6/1997 |
| JP | 2673310 | 11/1997 |
| JP | 2002 524636 | 8/2002 |
| JP | 2002 348396 | 12/2002 |
| JP | 2007 136966 | 6/2007 |
| JP | 2008 127872 | 6/2008 |
| WO | 2006 101142 | 9/2006 |

* cited by examiner

*Primary Examiner* — Christina Johnson
*Assistant Examiner* — Saeed Huda
(74) *Attorney, Agent, or Firm* — Oblon, Spivak, McClelland, Maier & Neustadt, L.L.P.

(57) ABSTRACT

To provide a foam board of a polyolefin resin which has an excellent heat insulating property and sound absorption property, of which a product can be material-recycled and which can continuously be produced at a low cost; a method for producing a foam board, which comprises extrusion-foaming by ejecting a mixture of a polyolefin resin composition containing a linear polypropylene resin having a melt tension of from 5 to 30 g at 230° C. and a foaming agent containing at least carbon dioxide in the supercritical state, by means of an extruder which has a multi-hole type die having an opening diameter of from 0.1 to 1.0 mm and the number of openings of from 50 to 5,000 at an ejection amount (V) of from 0.05 to 0.45 kg/hr per one opening in the die at a melt-extrusion temperature of from 160 to 250° C., under atmosphere at a proximal resin pressure of from 7 to 20 MPa at the openings of the die.

18 Claims, No Drawings

FOAM BOARD OF POLYOLEFIN RESIN AND METHOD FOR ITS PRODUCTION

TECHNICAL FIELD

The present invention relates to a polyolefin foam board which has an excellent heat insulating property, sound absorption property and moisture penetration property and is excellent in recycling, and a method for its production.

BACKGROUND ART

A foam of a polyolefin resin composition has an excellent balance of properties and cost and is excellent in a recycling property of the resin. The foam of a polyolefin resin composition is thereby widely used for applications as heat insulating building materials, applications as automobile parts, applications as packaging cushion materials, etc. For example, for an application as heat insulating building materials, a foam board of a polypropylene resin or a polyethylene resin is applied to the inside of floor or wall of buildings. Since such a foam board has an excellent heat insulating property, it is widely used in markets.

Foam boards and foam sheets made of a polyolefin resin composition have already been studied variously. For example, Patent Document 1 discloses a closed cell foam of a polypropylene with a high foaming rate, which is in the form of a bundle of strands.

Further, Patent Document 2 discloses a method for producing a polyethylene resin foam having open cells. This production method comprises mixing a molten crosslinking polyethylene resin (a), a heat decomposable foaming agent and an organic peroxide and further a powder polypropylene resin (b) having a melting point higher by 20° C. than the crosslinking polyethylene resin and being at most 190° C., in a specific ratio and uniformly dispersing the powder polypropylene resin (b) in a non-molten state, followed by heating so that while the crosslinkable polyethylene resin (a) is crosslinked and foamed, and the polymer polypropylene resin (b) is melted.

Further, Patent Document 3 discloses an open cell foam of a polyolefin resin having a cell size of at least 1 mm and a method for its production. That is, the cell size is large at a certain level, and in some cases, by using a foam of a polyolefin resin composition on which holes are formed by a needle or the like, a sound absorption effect is aimed.

Further, Patent Document 4 discloses a method for producing an extruded propylene resin foam produced by heating a propylene resin so as to be in a molten state and kneading the molten propylene resin while applying a shearing stress, followed by extrusion-foaming from a die for forming. In this production method, a propylene resin is extrusion-foamed so that at the position where the cross section perpendicular to the flowing direction of the resin flowing path becomes the minimum in the vicinity of an exit of the die for extrusion, the pressure gradient (k) represented by a specific formula satisfies 50 MPa/m$\leq$k$\leq$800 MPa/m, and the decompression rate (v) represented by a specific formula satisfies 5 MPa/s$\leq$v$\leq$100 MPa/s. Patent Document 4 discloses an open cell foam wherein the total area of broken cell parts evaluated by a cross-sectional photograph of the foam thus obtained is at least 2% of the total area of the observed surface.

Patent Document 1: JPB2620968
Patent Document 2: JPB2673310
Patent Document 3: JP-A-2002-524636
Patent Document 4: WO2006/101142

DISCLOSURE OF THE INVENTION

Problems to be Solved by the Invention

In a case where the polypropylene foam made of a bundle of strands as described in Patent Document 1 is actually formed into a closed cell foam at a high foaming rate, such a foam will have a large cell size, and its heat conductivity may be insufficient in some cases. Further, when a closed cell foam is formed, cell structure formation at the time of foaming is largely influenced by the extrusion condition of an extruder, and it is substantially difficult to form a closed cell structure stably under a high extrusion condition with an excellent productivity (i.e. such a condition that a high shearing force is applied at the time of passing through holes in the die).

Further, the method for producing a polyethylene resin foam as described in Patent Document 2 has a problem such that it is not suitable for continuous mass production, since it has many steps such as a formation step, a crosslinking step and a foaming step. Further, in recent years, recycling of plastic molded products is demanded to overcome environmental problems, etc., however, a polyolefin resin composition produced by the production method of Patent Document 2 has a difficulty in that it is poor in recycling property such that in a case where in a step of recycling for reproduction, the composition passes a step of applying heat history such as melting for repelletizing, decomposition of a graft composition or the like relatively easily occurs, and melt properties required for foaming cannot be maintained.

Further, the invention described in Patent Document 3 has a problem such that since in addition to forming holes on a surface by a needle or the like, the cell size is at least 1 mm, heat conductivity is large, and a sufficient heat insulating property cannot be obtained. Therefore, it is difficult to use the obtained open cell foam of a polyolefin resin in an application as heat insulating building material.

Further, in the case of the invention described in Patent Document 4, since extrusion is carried out at a region where a shearing force is relatively mild at the time of extrusion-foaming, there is a restriction such that the ejection amount per one hole at the time of extrusion cannot be sufficiently increased. Therefore, the ejection amount by extrusion cannot be substantially increased, and sufficient productivity cannot be obtained in some cases.

The present invention has been made in order to solve the above problems, and it is an object of the present invention to provide a foam board of a polyolefin resin which is excellent in a heat insulating property, a sound absorption property, a moisture penetration property and recycling.

Further, it is an object of the present invention to provide a method for producing a foam board of a polyolefin resin wherein the ejection amount per unit opening in a die can be increased by increasing the ability of an extruder to supply a resin and reducing the total opening area of the openings of the die, whereby the closed cell proportion of a foam to be obtained can be made to be small, and continuous production can be carried out stably at a low cost.

Means to Solve the Problems

The present inventors have conducted extensive studies and as a result, have arrived at the following present invention which accomplishes the above objects. Thus, the present invention has been accomplished.

(1) A method for producing a foam board, which comprises extrusion-foaming by ejecting a mixture of a polyolefin resin composition containing a linear polypropylene resin having a melt tension of from 5 to 30 g at 230° C. and a foaming agent containing at least carbon dioxide in the supercritical state, by means of an extruder which has a multi-hole type die having an opening diameter of from 0.1 to 1.0 mm and the number of openings of from 50 to 5,000 at an ejection amount (V) of from 0.05 to 0.45 kg/hr per one opening in the die at a melt-extrusion temperature of from 160 to 250° C., under atmosphere at a proximal resin pressure of from 7 to 20 MPa at the openings of the die.
(2) The method for producing a foam board according to the above (1), wherein the relationship of the melt flow rate (MFR) at 230° C. and the melt tension (MT) at 230° C. of the linear polypropylene resin satisfies the following formula (1):

$$\mathrm{Log}(MT) > -1.33\, \mathrm{Log}(MFR) + 1.2 \tag{1}$$

(MFR is a numerical value having a unit of g/10 minute, and MT is a numerical value having a unit of g).
(3) The method for producing a foam board according to the above (1) or (2), wherein the foaming agent is used in an amount of from 4 to 20 parts by mass, based on 100 parts by mass of the polyolefin resin composition.
(4) The method for producing a foam board according to any one of the above (1) to (3), wherein the extruder is a tandem extruder provided with two screws in series wherein a screw diameter (D) is from 40 to 80 mm, and when a screw length is L, L/D is from 15 to 40.
(5) A foam board, which is produced by foaming a polyolefin resin composition containing a linear polypropylene resin having a melt tension of from 5 to 30 g at 230° C. by using a foaming agent containing carbon dioxide and which has a foaming rate of at least 10 times, an open cell proportion of at least 60% as measured in accordance with ASTM-D2856, an average cell size of at most 200 µm and a cell size distribution coefficient of at most 30%.
(6) The foam board according to the above (5), which has a heat conductivity of from 20 to 45 mW/mK as measured in accordance with JIS-A 1412 and an acoustic absorption property of NRC (average value of sound absorption coefficients by reverberation at 250 Hz, 500 Hz, 1,000 Hz and 2,000 Hz) of at least 0.20.

Effects of the Invention

According to the present invention, it is possible to provide a foam board of a polyolefin resin composition which has a large heat conductivity and an excellent heat insulating property and which is excellent in a moisture penetration property and recycling property. Further, it is possible to provide a method for producing a foam board of the above polyolefin resin composition, stably at a low cost by extrusion-foaming.

BEST MODE FOR CARRYING OUT THE INVENTION

The polyolefin resin composition of the present invention contains a polypropylene resin (hereinafter referred to as polypropylene resin A) having specific physical properties. The polypropylene resin A essentially has a molten tension of from 5 to 30 g at 230° C., preferably from 6.5 to 20 g, more preferably from 7.5 to 10 g. If the molten tension is less than 5 g, cells tend to break at a time of foaming, and if the molten tension exceeds 30 g, cells do not grow sufficiently at a time of foaming.

Further, the relationship of the melt flow rate (MFR) at 230° C. and the melt tension (MT) at 230° C. of the polypropylene resin A preferably satisfies the following formula (1) (MFR is a numerical value having a unit of g/10 min, and MT is a numerical value of g). Here, MFR is measured in accordance with ASTM-D1238.

$$\mathrm{Log}(MT) > -1.33\, \mathrm{Log}(MFR) + 1.2 \tag{1}$$

If the polypropylene resin A does not satisfy the formula (1) in the relationship of the melt tension and MFR, the melt flowability of the resin is insufficient to the increase of the molten tension, and problems may arise such that the resin pressure is remarkably increased at a time of extruding, or it is difficult to obtain a highly expanded foam, since a cell film cannot be stretched sufficiently at the time of foaming. Particularly, the value of the left side of the formula (1) is preferably by 0.5 to 3 higher than the right side, particularly preferably higher by 0.5 to 2 than the right side.

In the present invention, the polypropylene resin A is required to be a linear polymer. The linear means that each molecule chain of a propylene polymer which constructs the polypropylene resin is an aggregate polymer wherein propylene monomers which construct the propylene polymer and α-olefin monomers which can copolymerize with the propylene monomers are substantially polymerized in the form of one string each other. Since this linear polymer does not have a crosslinking structure formed by using a chemical cross-linking, electron beam cross-linking or the like or a graft structure such as long chain branch, production or quality can be relatively easily controlled, and deterioration of the molecule structure due to heat histories repeated in a step such as repelletization carried out for recycling tends not to occur.

In the polyolefin resin composition of the present invention, a polypropylene resin (hereinafter referred to as polypropylene resin B) other than the polypropylene resin A may be blended. The polypropylene resin B may, for example, be a propylene homopolymer, a copolymer comprising a propylene and an α-olefin other than the propylene which is copolymerizable with the propylene or a mixture of a polypropylene resin and a polyolefin resin other than the polypropylene resin such as a polyethylene resin. Such a polyolefin resin may be used alone, or two or more of them may be used in combination.

As the polypropylene resin B, a polymer employing a propylene having a relatively large molecular weight solely, a copolymer mainly employing a propylene and an ethylene or a mixed resin of a polypropylene resin and a polyethylene resin is preferably used, since an extrusion-foaming property is excellent, and properties of a foam to be obtained are excellent.

As the α-olefin other than the ethylene which is copolymerizable with the above ethylene is not particularly restricted, however, propylene, 1-butene, 1-pentene, 1-hexene, 4-methyl-1-pentene, 1-heptene or 1-octene may be mentioned. Such an α-olefin other than ethylene may be used alone, or two or more of them may be used in combination. Further, as the α-olefin other than the propylene which is copolymerizable with the above propylene, is not particularly restricted, however, ethylene, 1-butene, 1-pentene, 1-hexene, 4-methyl-1-pentene, 1-heptene or 1-octene may, for example, be mentioned. Such an α-olefin other than the propylene may be used alone, or two or more of them may be used in combination.

In a case where the polyolefin resin composition of the present invention contains the polypropylene resin B, the polypropylene resin B is preferably contained in an amount of at most 200 parts by mass, particularly preferably at most 100 parts by mass, per 100 parts by mass of the polypropylene resin A. If the content of the polypropylene resin B exceeds 100 parts by mass, the influence of the polypropylene resin B on the foaming property becomes too large, and the foaming property may be impaired in some cases. Further, in a case where as the polypropylene resin B, a mixed resin containing a polypropylene resin and a polyethylene resin is used, the content of polypropylene resin in the mixed resin is not particularly restricted, however, it is preferably from 40 to 100 wt %, more preferably from 60 to 100 wt %. If the content of the polypropylene resin in the mixed resin is less than 40 wt %, the mechanical strength or the heat durability of a foam to be obtained may be insufficient.

As the foam used in the present invention, a foam containing carbon dioxide in the supercritical state is used, and the amount of the foam containing carbon dioxide in the supercritical state is preferably from 4 to 20 parts by mass, more preferably from 5 to 15 parts by mass, per 100 parts by mass of the polyolefin resin composition. If the amount of the foam containing carbon dioxide in the supercritical state is less than 4 parts by mass, the foam rate tends to be low, and the heat insulating property tends to deteriorate due to enlargement of cells. If the amount of the foam exceeds 20 parts by mass, large voids are formed in the foam due to an excess amount of carbon dioxide.

The polyolefin resin composition of the present invention contains the polypropylene resin A as an essential component and as the case requires, contains the polypropylene resin B. In addition to these components, so far as the object of the present invention is not impaired, one, two or more of an additive such as a phenol type, a phosphorus type, an amine type or a sulfur type antioxidant (age resistor), a heat stabilizer, a photostabilizer, a UV absorber, a phosphorus type, a nitrogen type, a halogen type or an antimony type fire retardant, a lubricant, a metal damage proofing agent, an antistatic agent, a filler, a stain, a cell nucleus forming agent or a crystal nucleus may be added.

The cell nucleus forming agent is not particularly restricted, however, talc, calcium carbonate, clay, kaolin, mica, magnesium oxide, zinc oxide, carbon black, glass, quartz, silica, alumina, novaculite, hydroalumina, iron, iron oxide, silicon dioxides or titanium oxide may, for example, be mentioned.

The crystal nucleus forming agent is not particularly restricted. In general, a rosin type crystal nucleus forming agent, a sorbitol type crystal nucleus forming agent or a phosphate type crystal nucleus forming agent may be mentioned. The rosin type crystal nucleus forming agent is not particularly restricted, so far as it is a rosin resin, and dibenzyldene sorbitol (DBS) manufactured by New Japan Chemical Co., Ltd. may, for example, be mentioned. The phosphate type crystal nucleus forming agent is not particularly restricted, and NA-11, manufactured by ADEKA CORPORATION may, for example, be mentioned. Such a crystal nucleus forming agent may be used alone, or some crystal nucleus forming agents may be used in combination.

The foam board of the present invention is produced by using an extruder which is provided with a die at its tip and has a forming system. The polyolefin resin composition containing the polypropylene resin A and a foaming agent containing at least carbon dioxide in the supercritical state are mixed, and the mixture is extruded under an atmosphere at an molten extrusion temperature of from 160 to 250° C. at a proximal resin pressure (pressure loss) at the openings of the die of from 7 to 20 MPa.

Here, "at the proximal of the openings of the die" means that the resin is just before injected into an opening part of the die. For example, it is a resin path between from the tip of the extruder connected to the die to the opening part of the die.

If the molten extrusion temperature is less than 160° C., carbon dioxide in the supercritical state tends not to melt in a resin and disperse. If the molten extrusion temperature exceeds 250° C., deterioration of the propylene resin begins such that molecule chains are cut by heat. The molten extrusion temperature is particularly preferably from 170° C. to 240° C.

Further, in the present invention, the pressure loss at the proximal part of the die in the extruder is from 7 to 20 MPa. If the pressure loss is less than 7 MPa, carbon dioxide in the supercritical state which is dissolved in the polyolefin resin composition tends to vaporize in the extruder and in the die, foaming tends to occur in the interior of the apparatus, cells fuse and grow excessively, foaming rate is lowered, and outer appearance remarkably deteriorates. If the pressure loss exceeds 20 MPa, large shearing force tends to be applied on cells at the time of forming cells for foaming, cells break, whereby foaming rate is lowered, and cell structure becomes heterogeneous. Such an incomplete cell structure impairs obtaining sufficient heat properties of the foam boards. The pressure loss is preferably from 7.5 to 20 MPa, more preferably from 8 to 15 MPa.

From the viewpoint of outer appearance of a foam product, easiness of fixing the shape and reducing the size of closed cell of the foam, the diameter of the opening (pore) of the die in the extruder used in the present invention is from 0.1 to 1.0 mm, preferably from 0.3 to 0.6 mm. If the diameter of the opening of the die is less than 0.1 mm, the strand diameter of the foam structure becomes too small, and the foam tends to be fragile at a time of pulling. If the diameter of the opening of the die exceeds 1.0 mm, the strand diameter becomes too large, and it is difficult to form a board shape for obtaining smoothness. The depth of the die is preferably from 0.1 to 10 mm, and plural opening parts are preferably formed on the front surface of the die.

Further, the number of openings (pore) of the die in the extruder used in the present invention is from 50 to 5,000, a multi-hole type die having openings of 100 to 3,000 is preferably used, and an ejection amount V per one opening (pore) of the die is required to be from 0.05 to 0.45 kg/hr. Here, the ejection amount V (kg/hr) per one opening of the die can be obtained by the following formula.

$$\text{Ejection amount } V \text{ (kg/hr) per one opening of the die} = \text{ejection amount of extruder (kg/hr)/the number of openings of the die}$$

It is possible to control the ejection amount V per one opening of the die within the above range by increasing the rotational frequency of the extruder; increasing a pitch between screws of the extruder; deepening a ditch between screws of the extruder, etc.

If the ejection amount V (kg/hr) per one opening of the die is less than 0.05, productivity deteriorates, the open cell proportion becomes low, it is difficult to maintain the pressure loss appropriately for foaming at the dice part, and it is difficult to obtain a foam at a sufficient rate. On the other hand, if the ejection amount V (kg/hr) exceeds 0.45, cells tend to break, a sufficient heat insulating property cannot be obtained, and the foam shape cannot be maintained. The ejection amount V (kg/hr) is particularly preferably from 0.09 to 0.3.

Depending on types of the extruder, the total extrusion ejection amount is preferably from 1 to 1,000 kg/hr. In a case of a substantial production machine type having a relatively large screw diameter, the total extrusion ejection amount is preferably from 20 to 1,000 kg/hr. On the other hand, in a case of a lab type having a relatively small screw diameter, the total extrusion ejection amount is preferably from about 15 kg/hr to 50 kg/hr. In order to obtain an open cell proportion of at least 60% in a foam board, the total extrusion ejection amount is preferably from 20 to 50 kg/hr in the lab type, and from 180 to 1,000 kg/hr in the substantial production machine type.

If the total extrusion ejection amount is too large, although the open cell proportion is preferably high, cells tend to break, a sufficient heat insulating property cannot be obtained, and foam shape cannot be maintained in some cases. On the other hand, if the total extrusion ejection amount is too small, productivity becomes poor, the open cell proportion becomes small, a heat insulating property deteriorates, it is difficult to maintain the appropriate pressure loss for forming at the die portion, and a foam at a sufficient expansion ratio cannot be obtained.

The screw diameter (d) of the extruder to be used is preferably from 40 to 80 (mm), and when a screw length is L (mm), L/D is preferably from 15 to 40. Further, a tandem extruder provided with two screws in series as a basic construction is preferably used. By using the tandem extruder, a foam can be appropriately produced, since it is possible to control the rotational frequency of each screw, independent of the pressure loss condition of the die portion and ejection amount. The shape of the die to be used is not particularly restricted, however, a die of which the number of openings, shape and thickness are designed so that the pressure loss at one opening portion becomes from 7 to 20 MPa. When a die satisfying such conditions is selected, a foam board having a sufficient heat property can be preferably obtained.

Further, as a specific example of a method for producing the foam board of the present invention, the polyolefin resin composition is extruded by an extruder provided with a carbon dioxide supplying line from an apparatus for supplying carbon dioxide in the supercritical state on the way of a cylinder barrel, as below. That is, a foaming polyolefin resin composition is heated to a predetermined temperature and uniformly melt-kneaded, and then the melt-kneaded resin composition is supplied with a predetermined amount of carbon dioxide in the supercritical state from a supplying line of an extruder, whereby the resin composition is extrusion-molded into a board shape, and a foam is produced.

Further, as the case requires, in order to control a foam board state, shape may be controlled, or size may be controlled by using a shearing apparatus, sandwiching conveyer or the like. Further, as the case requires, as a face material, a sheet made of aluminum, non-woven fabric, a sheet such as leather may be bonded on one surface or both surfaces of the foam board in order to impart various properties such as mechanical strength, heat durability or fire resistance.

By the method of the present invention for producing a foam board, at least 10 times of a foaming rate is possible, and the foaming rate is preferably from 12 to 60 times. If the foaming rate is less than 10 times, weight or material cost in order to obtain a sufficient member heat property tends to be too large.

The open cell property of the foam board of the present invention as measured in accordance with the standard of ASTM-D2856 is at least 60%, preferably at least 70%, most preferably at least 80%. If the open cell proportion is less than 60%, a sufficient moisture penetration property as the foam board cannot be maintained, and condensation or the like results. Further, if the open cell proportion is less than 60%, it is necessary to maintain a low shearing force applied on a molten resin which passes through a die for extruding in order to prevent breakage of cells, industrial mass production becomes difficult, and the sound absorption rate becomes low. The upper limit of the continuous cell proportion is not particularly restricted, however, as a foam board, in order to maintain a mechanical strength of the foam at a level of suppressing bending or breakage at the time of handling, the open cell proportion is preferably at most 98%, particularly preferably at most 95%. In the present invention, the open cell proportion of the foam board is controlled to be high (the closed cell proportion is controlled to be low) as mentioned above, whereby important properties such as the sound absorption, moisture penetration property or gas permeability can be controlled.

In order to obtain an excellent heat property, the foam board of the present invention preferably has the above high open cell proportion and the average cell size of at most 200 μm. The average cell size of at most 200 μm and the cell size distribution coefficient of at most 30% can be established. If the average cell size exceeds 200 μm, the heat insulating property deteriorates, and if the cell size distribution coefficient exceeds 30%, the heat insulating property also deteriorates. Particularly, the average cell size is preferably from 10 to 170 μm, and the cell distribution coefficient is preferably from 1 to 20%.

Further, the average cell size can be obtained by cutting an obtained foam sample into small pieces, observing their cross-sectional area by SEM and calculating an average value. On the other hand, the cell distribution coefficient can be obtained by calculating the average cell sized and the standard deviation of the cell sizes and calculating the formula of (the cell distribution coefficient)=(the standard deviation of the cell size)/(the average cell size).

The heat conductivity of the foam board of the present invention measured in accordance with JIS-A1412 is preferably from 20 to 45 mW/mK, particularly preferably from 20 to 40 mW/mK, whereby the foam board of the present invention thereby has an appropriate heat insulating property.

EXAMPLES

Now, the present invention will be described in further detail with reference to Examples, however, the present invention is by no means restricted thereto.

Example 1

A polypropylene resin A having MFR of 3.3 (g/10 min) at 230° C. and a molten tension of 7.6 g at 230° C. was subjected to extrusion-molding by using a tandem type single axial extruder (screw length) (L)/screw diameter=35, manufactured by Kawata Corporation, KGT-50-65) provided with a carbon dioxide supplying line from an apparatus for supplying carbon dioxide in the supercritical state (CO2-3, manufactured by Kawata Corporation) at a first step and a die at a top of a second step.

The amount of supplying carbon dioxide was set to be 1.2 kg/hr, the extrusion amount was controlled by a rotational frequency of a screw of the extruder at the first step so that 6 parts by weight of carbon dioxide was contained per 100 parts by weight of the polypropylene resin A, the resin pressure in the proximal part of openings of the die was adjusted to be 8.9 MPa (MPA) by controlling a rotational frequency of a screw of the extruder at the second step, and extrusion-foaming was carried out with the opening diameter of the die, the number of openings and the ejection amount shown in Table to produce a foam board of a polyolefin resin.

Example 2

A foam board of a polyolefin resin was produced in the same manner as in Example 1, except that the amount of supplying carbon dioxide was set to be 0.9 kg/hr, the extrusion amount was adjusted so that 6 parts by weight of carbon dioxide was contained per 100 parts by weight of polypropylene resin A by controlling a rotational frequency of the screw of the extruder at the first step, and the ejection amount was adjusted so that the resin pressure in the proximal part of openings of the die became 8.7 MPa by controlling a rotational frequency of the screw of the extruder at the second step.

Comparative Example 1

A foam board of a polyolefin resin was produced in the same manner as in Example 1, except that the amount of supplying carbon dioxide was set to be 0.5 kg/hr, the extrusion amount was adjusted by controlling a rotational frequency of the screw of the extruder at the first step so that 6 parts by weight of carbon dioxide was contained per 100 parts by weight of polypropylene resin A, and the ejection amount was adjusted so that the resin pressure in the proximal part of the openings of the die became 8.2 MPa by controlling a rotational frequency of the screw of the extruder at the second step.

Comparative Example 2

A foam board of a polyolefin resin was produced in the same manner as in Example 1, except that the amount of supplying carbon dioxide was set to be 0.78 kg/hr, the extrusion amount was adjusted by controlling a rotational frequency of the screw of the extruder at the first step so that 6 parts by weight of carbon dioxide was contained per 100 parts by weight of polypropylene resin A, and the ejection amount was adjusted so that the resin pressure in the proximal part of the openings of the die became 8.1 MPa by controlling a rotational frequency of the screw of the extruder at the second step.

Comparative Example 3

A foam board of a polyolefin resin was produced in the same manner as in Example 1, except that a propylene resin B (homopolypropylene resin) having MFR of 6 g/10 min at 230° C. and a molten tension of 1.8 g at 230° C. was used, the amount of supplying carbon dioxide was set to be 0.9 kg/hr, the extrusion amount was adjusted by controlling a rotational frequency of the screw of the extruder at the first step so that 6 parts by weight of carbon dioxide was contained per 100 parts by weight of the polypropylene resin, and the ejection amount was adjusted so that the resin pressure in the proximal part of the openings of the die became 5.5 MPa by controlling a rotational frequency of the screw of the extruder at the second step.

With respect to the polyolefin (polypropylene) resin foams obtained in Examples 1 and 2 and Comparative Examples 1 to 3, (1) foam density, (2) average cell size, (3) cell size distribution coefficient, (4) heat conductivity, (5) industrial productivity, (6) production amount (7) open cell proportion and (8) sound absorption property were evaluated by the following methods.

(1) Foam density: An obtained foam was cut into test pieces of 20 cm×20 cm×2.5 cm square, its weight and length of each side were accurately measured, and the foam density was calculated by the following formula.

$$\text{Foam density }(G/L) = \text{Weight of foam }(G)/\text{Volume of foam }(L)$$

(2) Average cell size: An obtained foam was cut into test pieces of the above size, its cross-section area was measured by SEM super scan 220, manufactured by Shimadzu Corporation at a magnifying power of 50, and average value of cell size of from about 10 to 20 cells was calculated.

(3) Cell size distribution coefficient: An obtained foam was cut into test pieces of the above size, its cross-section area was measured by SEM super scan 220, manufactured by Shimadzu Corporation at a magnifying power of 50, and average value of cell size of from about 10 to 20 cells and standard deviation of the cell size were calculated. From these values, the cell size distribution coefficient was calculated from the following formula.

$$\text{Cell size distribution coefficient} = \text{standard deviation of cell size/average value of cell size}$$

(4) Heat conductivity: In accordance with JISA-1412, an obtained foam was cut into test pieces having the above size, and heat conductivity was measured by using heat conductivity measuring apparatus HC-074, manufactured by EKO Instruments Co., Ltd.

(5) Mass production productivity: When a rotational frequency of the screw at the first step, which is a controlling factor of an extruded amount of a used extruder is the maximum (110 rpm in the present Examples), the production amount is the substantially maximum level. Under respective conditions, the mass production productivity was evaluated under the following definitions, depending on the rotational frequency of the screw of the first step.

When the rotational frequency of the first step R is $70 \leq R \leq 110$ rpm, ○.

When the rotational frequency of the first step R is $40 \leq R < 70$ rpm, ○ to Δ.

When the rotational frequency of the first step R is $0 \leq R < 40$ rpm, x.

(6) Production amount: A foam was produced by extrusion continuously for 1 hour under each condition, and the total amount of an obtained foam was calculated as the production amount.

(7) Open cell proportion: In accordance with ASTM-D2856, an obtained foam was cut into test pieces having a square shape of 2 cm×2 cm×2 cm, gas substantial flow volume was measured by using Micrometrics Accupyc 1330, manufactured by Shimadzu Corporation, the open cell proportion was calculated from the following formula by applying its value.

$$\text{Open cell proportion (\%)} = \text{gas flow substantial volume/apparent volume of sample}$$

(8) Sound absorption property: In accordance with JIS A1405, a foam was cut into test pieces having a disc shape of a diameter of about 10 cm, and particle incident water absorption rate was measured.

NRC: Average value of sound absorption coefficient by evaporation at 250 Hz, 500 Hz, 1,000 Hz and 2,000 Hz.

Table 1 shows blend composition, extrusion condition and physical properties of obtained forms in the present invention in together.

TABLE 1

|  | Ex. 1 | Ex. 2 | Comp. Ex. 1 | Comp. Ex. 2 | Comp. Ex. 3 |
|---|---|---|---|---|---|
| Propylene resin composition |  |  |  |  |  |
| Propylene resin A | 100 parts by wt | 100 parts by wt | 100 parts by wt | 100 parts by wt |  |
| General propylene resin B |  |  |  |  | 100 parts by wt |
| 230° C. MFR | 3.3 g/10 min | 3.3 g/10 min | 3.3 g/10 min | 3.3 g/10 min | 6 g/10 min |
| Molten tension | 7.6 g | 7.6 g | 7.6 g | 7.6 g | 1.8 g |
| Carbon dioxide content | 6 parts by wt | 6 parts by wt | 6 parts by wt | 6 parts by wt | 6 parts by wt |
| Extruder set up |  |  |  |  |  |
| First step 50 mm ϕ extruder |  |  |  |  |  |
| Cylinder barrel setting temperature | 180° C. | 180° C. | 180° C. | 180° C. | 180° C. |
| Rotational frequency | 110 RPM | 70 RPM | 40 RPM | 70 RPM | 70 RPM |
| Second step 65 mm ϕ extruder |  |  |  |  |  |
| Cylinder barrel setting temperature | 180° C. | 180° C. | 180° C. | 180° C. | 180° C. |
| Rotational frequency | 12 RPM | 12 RPM | 12 RPM | 12 RPM | 12 RPM |
| Die resin pressure | 8.9 MPA | 8.7 MPA | 8.2 MPA | 8.1 MPA | 5.5 MPA |
| Die | Die 1 | Die 1 | Die 1 | Die 1 | Die 1 |
| The number of openings of die | 276 | 276 | 276 | 276 | 276 |
| Diameter of openings of die | 0.5 mmϕ | 0.5 mmϕ | 0.5 mmϕ | 0.5 mmϕ | 0.5 mmϕ |
| The total ejection amount | 30 KG/H | 15 KG/H | 8 KG/H | 13 KG/H | 15 KG/H |
| V (ejection amount per one open of die) | 0.109 | 0.054 | 0.029 | 0.047 | 0.054 |
| Physical properties |  |  |  |  |  |
| Foam density | 32 G/L | 34 G/L | 36 G/L | 37 G/L | 101 G/L |
| Expansion ratio | 28 times | 27 times | 25 times | 24 times | 9 times |
| Average size cell | 103 μm | 146 μm | 156 μm | 188 μm | 180 μm |
| Cell distribution coefficient | 22% | 21% | 20% | 26% | 43% |
| Open cell proportion | 88% | 70% | 55% | 32% | 56% |
| Sound absorption property (NRC) | 0.29 | 0.25 | 0.18 | 0.09 | 0.18 |
| Heat conductivity | 37 mW/mK | 38 mW/mK | 41 mW/mK | 46 mW/mK | 46 mW/mK |
| Industrial mass productivity | ○ | ○ | ○ to Δ | X | ○ |
| Production amount | 30 KG/H | 15 KG/H | 8 KG/H | 13 KG/H | 15 KG/H |

INDUSTRIAL APPLICABILITY

By the present invention, it is possible to provide a foam board of a polyolefin resin composition which has an excellent extrusion foam property and heat insulating sound absorption property, can be recycled and can be continuously produced stably at a low Cost.

The entire disclosure of Japanese Patent Application No. 2007-169714 filed on Jun. 27, 2007 including specification, claims and summary are incorporated herein by reference in its entirety.

The invention claimed is:

1. A method for producing a foam board, which comprises extrusion-foaming by ejecting a mixture of a polyolefin resin composition containing a linear polypropylene resin having a melt tension of from 5 to 30 g at 230° C. and a foaming agent containing at least carbon dioxide in the supercritical state, by means of an extruder which has a multi-hole type die having an opening diameter of from 0.1 to 1.0 mm and the number of openings of from 50 to 5,000 at an ejection amount (V) of from 0.05 to 0.45 kg/hr per one opening in the die at a melt-extrusion temperature of from 160 to 250° C., under atmosphere at a proximal resin pressure of from 7 to 20 MPa at the openings of the die.

2. The method for producing a foam board according to claim 1, wherein the relationship of the melt flow rate (MFR) at 230° C. and the melt tension (MT) at 230° C. of the linear polypropylene resin satisfies the following formula (1):

$$\text{Log}(MT) > -1.33 \text{ Log}(MFR) + 1.2 \tag{1}$$

(MFR is a numerical value having a unit of g/10 minute, and MT is a numerical value having a unit of g).

3. The method for producing a foam board according to claim 1 or 2, wherein the foaming agent is used in an amount of from 4 to 20 parts by mass, based on 100 parts by mass of the polyolefin resin composition.

4. The method for producing a foam board according to any one of claims 1 to 3, wherein the extruder is a tandem extruder provided with two screws in series wherein a screw diameter (D) is from 40 to 80 mm, and when a screw length is L, L/D is from 15 to 40.

5. The method for producing a foam board according to claim 1, wherein said linear polypropylene resin has a melt tension of from 7.5 to 10 g at 230° C.

6. The method for producing a foam board according to claim 2, wherein Log(MT) is 0.5-3 times greater than (−1.33 Log(MFR)+1.2).

7. The method for producing a foam board according to claim 1, wherein Log(MT) is 0.5-2 times greater than (−1.33 Log(MFR)+1.2).

8. The method for producing a foam board according to claim 1, wherein said die has an opening diameter of from 0.3 to 0.6 mm.

9. The method for producing a foam board according to claim 1, wherein a foaming rate is at least 10 times.

10. The method for producing a foam board according to claim 1, wherein a foaming rate is from 12 to 60 times.

11. The method for producing a foam board according to claim 1, wherein said foam board has an open cell proportion of at least 60%.

12. The method for producing a foam board according to claim 1, wherein said foam board has an open cell proportion of at least 70%.

13. The method for producing a foam board according to claim 1, wherein said foam board has an open cell proportion of at least 80%.

14. The method for producing a foam board according to claim 1, wherein said foam board has an open cell proportion of at most 95%.

15. The method for producing a foam board according to claim 1, wherein said foam board has an average cell size of at most 200 μm.

16. The method for producing a foam board according to claim 1, wherein said foam board has an average cell size of at most 200 μm and a cell size distribution coefficient of at most 30%.

17. The method for producing a foam board according to claim 1, wherein said foam board has an average cell size of from 10 to 170 μm.

18. The method for producing a foam board according to claim 1, wherein said foam board has a heat conductivity of from 20 to 45 mW/mK as measured in accordance with JIS-A 1412 and an acoustic absorption property of NRC (average value of sound absorption coefficients by reverberation at 250 Hz, 500 Hz, 1,000 Hz and 2,000 Hz) of at least 0.20.

\* \* \* \* \*